(12) United States Patent
Reisinger et al.

(10) Patent No.: US 10,344,932 B2
(45) Date of Patent: Jul. 9, 2019

(54) METHOD FOR GENERATING A LIGHT DISTRIBUTION ON A ROAD USING A MOTOR VEHICLE HEADLIGHT

(71) Applicant: ZKW Group GmbH, Wieselburg (AT)

(72) Inventors: Bettina Reisinger, Amstetten (AT); Markus Reinprecht, Hofstetten (AT); Thomas Mitterlehner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 146 days.

(21) Appl. No.: 15/520,036

(22) PCT Filed: Oct. 13, 2015

(86) PCT No.: PCT/AT2015/050253
§ 371 (c)(1),
(2) Date: Apr. 18, 2017

(87) PCT Pub. No.: WO2016/061599
PCT Pub. Date: Apr. 28, 2016

(65) Prior Publication Data
US 2017/0321857 A1 Nov. 9, 2017

(30) Foreign Application Priority Data
Oct. 21, 2014 (AT) .............................. A 50751/2014

(51) Int. Cl.
*B60Q 1/06* (2006.01)
*F21S 41/14* (2018.01)
(Continued)

(52) U.S. Cl.
CPC ................ *F21S 41/14* (2018.01); *B60Q 1/06* (2013.01); *F21S 41/176* (2018.01);
(Continued)

(58) Field of Classification Search
CPC ........ F21S 41/14; F21S 41/675; F21S 41/663; F21S 41/16; F21S 41/36; F21S 41/321;
(Continued)

(56) References Cited

U.S. PATENT DOCUMENTS 9,772,084 B2* 9/2017 Saito .................... G02B 26/105
2013/0058114 A1* 3/2013 Reiners ................... F21S 41/16
362/510
(Continued)

FOREIGN PATENT DOCUMENTS

DE 102013101023 A1 8/2014
EP 2581648 A1 4/2013

OTHER PUBLICATIONS

Search report issued in Austrian application No. A 50751/2014, completed Sep. 30, 2015.
(Continued)

*Primary Examiner* — Bao Q Truong
(74) *Attorney, Agent, or Firm* — Eversheds Sutherland (US) LLP

(57) ABSTRACT

Method for producing a light distribution on a road (8) using a motor vehicle headlight, wherein at least one laser beam (2) that can be modulated in intensity is directed in at least one coordinate direction in a scanning manner to a light conversion means (5) using at least one controlled beam deflection means (3) in order to generate an illuminated image (6) on same, said illuminated image being projected as a light image (6') onto the road using projection optics (7), wherein the image generated from the laser beam (2) using the beam deflection means (3) is split by deflecting the laser beam (2') by means of an image convolution means (4), and the sub-images are projected in a mirror-imaged manner in relation to a division line onto the light conversion means (5) to be combined and form an entire illuminated image (6). The invention also relates to a corresponding headlight for
(Continued)

motor vehicles, wherein an image convolution means (4) is arranged between the beam deflection means (3) and the light conversion means (5).

14 Claims, 7 Drawing Sheets

(51) Int. Cl.
    *F21S 41/20*     (2018.01)
    *F21S 41/36*     (2018.01)
    *F21S 41/32*     (2018.01)
    *F21S 41/675*     (2018.01)
    *F21S 41/663*     (2018.01)
    *G01S 17/02*     (2006.01)
    *G01S 17/89*     (2006.01)
    *F21S 41/365*     (2018.01)
    *F21S 41/176*     (2018.01)

(52) U.S. Cl.
    CPC ........... *F21S 41/285* (2018.01); *F21S 41/321* (2018.01); *F21S 41/36* (2018.01); *F21S 41/365* (2018.01); *F21S 41/663* (2018.01); *F21S 41/675* (2018.01); *G01S 17/023* (2013.01); *G01S 17/89* (2013.01)

(58) Field of Classification Search
    CPC ........ F21S 41/285; F21S 41/365; B60Q 1/06; G01S 17/023; G01S 17/89; F21V 9/30; F21V 9/32; F21V 7/00; F21V 7/0008; F21V 7/0025; F21V 7/041; F21V 13/02; F21V 13/08
    See application file for complete search history.

(56) References Cited

U.S. PATENT DOCUMENTS

| | | | |
|---|---|---|---|
| 2013/0094235 A1* | 4/2013 | Sugiyama | G02B 26/0858 362/514 |
| 2014/0029282 A1 | 1/2014 | Ravier et al. | |
| 2015/0029409 A1* | 1/2015 | Chen | F21S 41/16 349/5 |
| 2015/0055359 A1 | 2/2015 | Erdl et al. | |
| 2015/0124468 A1* | 5/2015 | Reiners | F21S 41/16 362/510 |
| 2017/0016588 A1 | 1/2017 | Saito | |

OTHER PUBLICATIONS

International Search Report for PCT/AT2015/050253, dated Jan. 29, 2016.

* cited by examiner

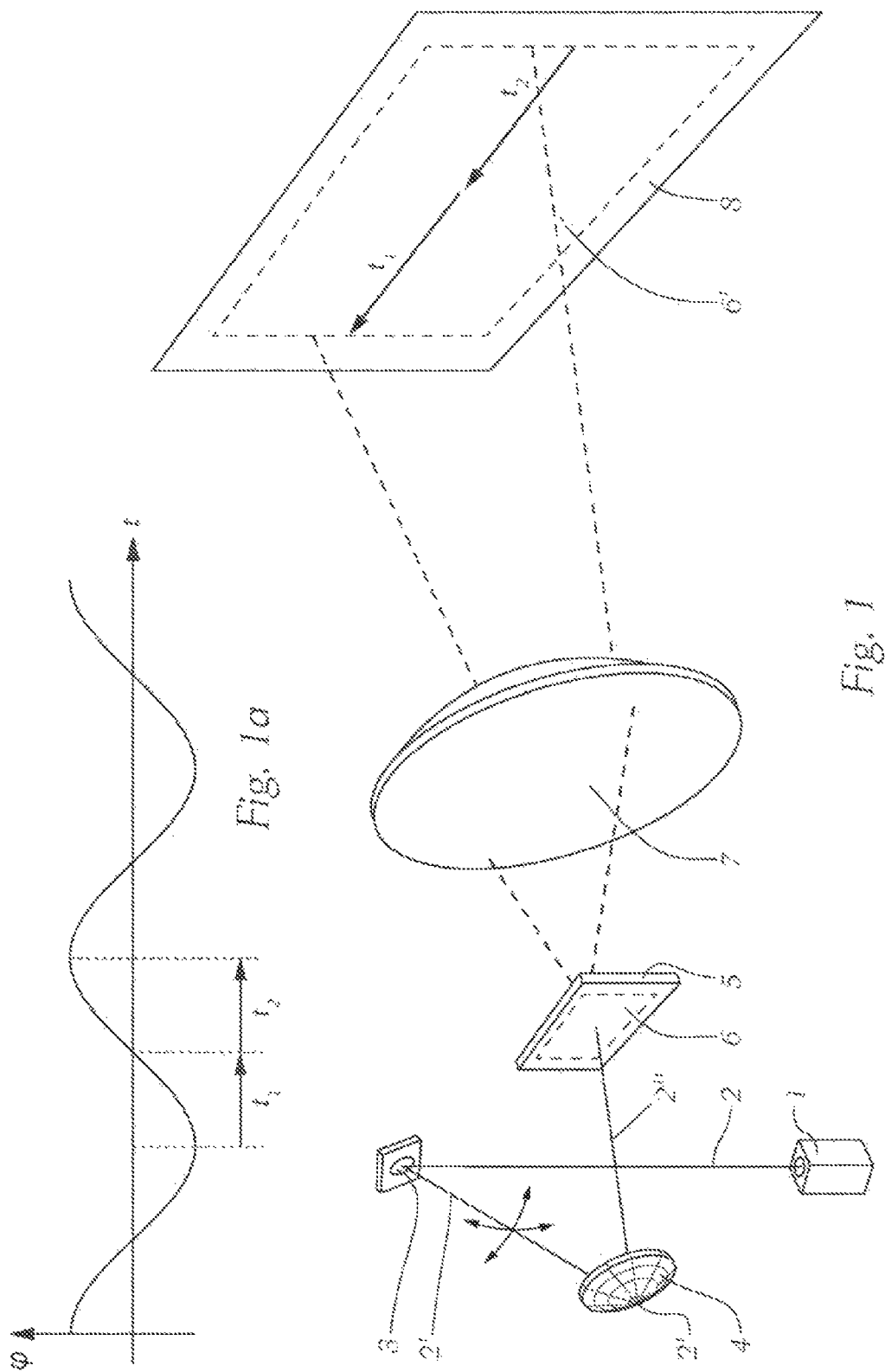

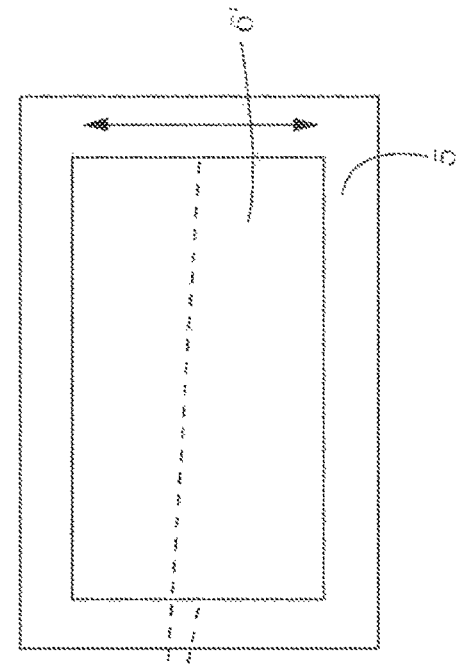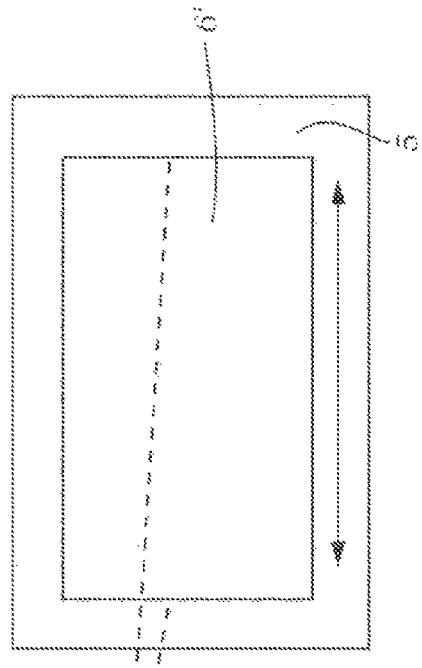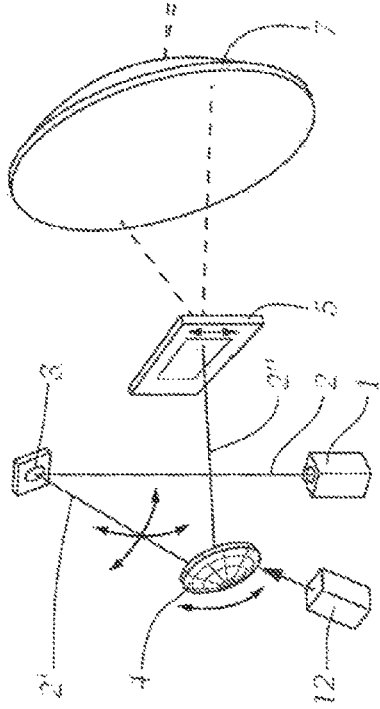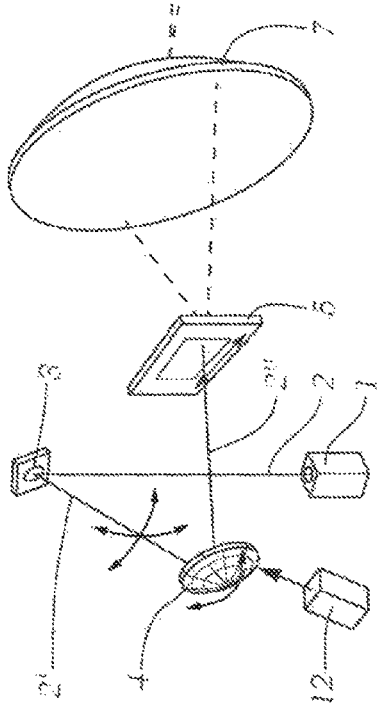
Fig. 11a
Fig. 11b

METHOD FOR GENERATING A LIGHT DISTRIBUTION ON A ROAD USING A MOTOR VEHICLE HEADLIGHT

The invention relates to a method for generating a light distribution on a road using a motor vehicle headlight, wherein at least one laser beam that can be modulated in intensity is directed in at least one coordinate direction in a scanning manner to a light conversion means using at least one controlled beam deflection means in order to generate an illuminated image on same, said illuminated image being projected as light image onto the road using a projection optic.

The invention also relates to a headlight for motor vehicles with at least one laser light source, the laser beam of which is directed in a scanning manner to at least one light conversion means using a beam deflection means, said light conversion means having a phosphorus for light conversion, and with a projection system for projecting the illuminated image, which is generated on the at least one light conversion means, as light image onto the road.

An example for a headlight according to prior art is described in EP 2 063 170 A2, with which, for illuminating the road with glare-free adaptive high beams, specific areas can be spared on the basis of other road users or on the basis of environmental parameters, such as the vehicle's own speed, twilight, weather, etc. In this case, the beam of a laser is directed by means of a micromirror, which is movable in two spatial directions, to an illuminated surface which contains the aforementioned phosphorus for converting the laser light to preferably white light. By means of a lens, the illuminated image of the illuminated surface is projected as light image onto the road.

The currently useable micromirrors oscillate resonantly in two axes or also only in one axis, wherein the brightest points, however, lie on the edge of the scan range. The intensity in both axes each corresponds to one sine oscillation with the maximum at the reversal point of the mirror because that is where the speed is the slowest. However, this phenomenon stands in contrast with the light distribution desirable for a headlight, the intensity distribution of which should be inverse thereto. Exactly in the center of the light distribution, high intensities are required, and for such purpose, high laser power, e.g. a great number of laser diodes, must be provided in the system used in order to achieve sufficiently high intensity in the darkest area of the light distribution. Toward the edge, the laser light source is dimmed by modulation to the correspondingly required value, and on average, only approximately 13% of the installed laser power is used.

One problem addressed by the invention is that of achieving a uniform light distribution for the light projected onto the road, without having to install an excessively high laser power.

This problem is solved with a method of the initially described type, with which, according to the invention, the image generated from the laser beam using the beam deflection means is split by deflecting the laser beam by means of an image convolution means, and the sub-images are projected in a mirror-imaged manner in relation to a division line onto the light conversion means to be combined and form an entire illuminated image.

In many cases of application, it is advantageous if the laser beam is deflected by means of the beam deflection means in two directions which are essentially orthogonal to one another.

In other applications, it can be expedient if the laser beam for generating a light band is fanned out as illuminated image.

In order to avoid stray light, it is recommended that the laser beam is optically/electrically blocked out in an area of the splitting/folding center.

In order to allow for an additional shifting of the entire illuminated image, it can be suitable if the image convolution means for shifting the illuminated image in at least one coordinate direction is adjusted by means of an actuator.

It is also advantageous if the distance of the sub-images from one another is determined by changing the distance of the image convolution means from the light conversion means. It is thus possible to generate brighter areas, for example, through overlapping of image regions.

The problem is also solved with a headlight of the aforementioned type, in which the headlight for motor vehicles according to the invention has at least one laser light source, the laser beam of which is directed in a scanning manner to a light conversion means using a beam deflection means which has a phosphorus for light conversion, and has a projection system for projecting the illuminated image, which is generated on the at least one light conversion means, as light image onto the road.

The core of the invention is thus that the image generated by the laser beam, prior to being converted in the light conversion means, is split and combined as mirror image to the division line and projected onto the light conversion means. Due to this splitting and folding, the initially bright edge regions reach the center toward the division line, thus generating the greater brightness in the image center, which is desired for a motor vehicle headlight, without requiring particularly great power from the laser light source.

If the image convolution means is designed as hollow cone-shaped mirror, the beam image can in principle be split and folded in every direction.

For splitting and folding in a preferred coordinate direction, it is expedient if the image convolution means is designed as mirror with at least two planar surfaces which are inclined at an angle to one another. It is expedient if the angle is between 5° and 45°, preferably between 10° and 15°.

However, in some cases it can be advantageous if the image convolution means is designed as cone-shaped prism or a triangular prism or pyramid prism.

In order to avoid unwanted stray light, it is recommended that the image convolution means is designed so as not to be reflecting in an area of the splitting/folding center.

For that purpose, it should be provided that the area of the splitting/folding center has measurements which correspond at least to the width of the laser beam.

In a practice-oriented embodiment, it can be provided that the ratio of the optically effective measurements of the image convolution means and the light conversion means are at least approximately similar in two beam deflection directions.

An additional shift of the entire image is possible if the image convolution means is movably mounted and adjustable by means of an actuator in at least one coordinate direction.

In the following, the invention and further advantages shall be described in more detail using exemplary embodiments which are depicted in the drawing.

FIG. 1 shows in a schematic depiction the for the invention essential components of a headlight and their connection;

FIG. 1a shows in a diagram the temporal deflection sequence of the beam deflection means in a coordinate direction for two consecutive periods of time;

FIGS. 11a and 11b show in a schematic depiction similar to FIG. 1 the additional realization of an illumination headlight range adjustment or a bending light.

Figure 2A:
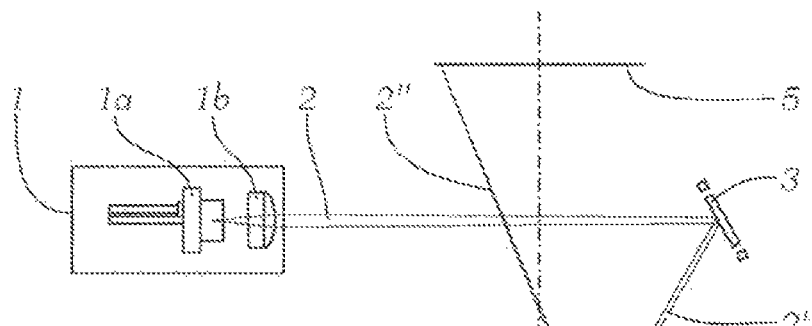
FIG. 2 shows in three individual depictions the beam path from the laser light source to the light conversion means for three different deflection angles of a micromirror.

FIG. 1 schematically shows a headlight with the parts essential for the invention as well as the beam path for said headlight, wherein it is understood that a motor vehicle headlight contains many other parts which allow for its meaningful use in a motor vehicle, particularly an automobile or a motorcycle. Light-engineering starting point of the headlight is a laser light source 1, which emits a laser beam 2 with an associated laser control (not depicted) which serves as power supply as well as monitor of the laser emission or, e.g. temperature control, and which is also designed for modulating the intensity of the emitted laser beam. In the context of the present invention, "modulating" means that the intensity of the laser light source can be changed, either continuously or pulsed, in the sense of an activation and deactivation. It is essential that the light power can be changed analogously dynamically, depending on the angular position of a mirror to be described in more detail below. In addition, there is also the possibility of activation and deactivation for a specific period of time in order to not illuminate or block out defined areas. An example of a dynamic control concept for generating an image by a scanning laser beam is, e.g. described in Austrian patent application A 50454/2013 of the applicant from Jul. 16, 2013. In practice, the laser light source frequently contains a plurality of laser diodes, e.g. six with 1 watt each, in order to reach the desired power or the required light flux.

The laser light source 1, for example, emits blue or UV light and usually has collimating optics as well as focusing optics, wherein the design of the optics depends, among others, on the type, number, and spatial placement of the laser diodes used, on the required beam quality, and on the desired laser spot size at the light conversion means.

The focused or formed laser beam 2 impinges on a micromirror 3 and is reflected on a light conversion means 5 by means of image convolution means 4, in the present example a hollow cone-shaped auxiliary mirror, said light conversion means 5, e.g., having a phosphorus for light conversion in a known manner. The phosphorus converts, for example, blue or UV light into "white" light. In the context of the present invention, "phosphorus" is generally a substance or a substance mixture which converts light of one wavelength into light of another wavelength or wavelength mixture, particularly into "white" light, which can be subsumed under the term "wavelength conversion."

Luminescent dyes are used, wherein the initial wavelength is generally shorter and thus of higher energy that the emitted wavelength mixture. The desired white light effect is generated by additive color mixing. In this context, "white light" is light of a spectral composition which, for human beings, generates the color effect "white." The term "light" is naturally not limited to the radiation visible only to the human eye. For the light conversion means, for example, opto-ceramics, which are transparent ceramics, such as YAG:Ce (an yttrium aluminum garnet doped with cerium) can be used.

It shall be noted at this point that in the drawing, the light conversion means is depicted as translucent phosphorus surface, on which the scanning laser beam or scanning laser beams generate an image which is initially projected from the opposite side. However, it is also possible to project initially from the side of the phosphorus which is scanned by the laser beam. In other words, both reflecting and transmissive beam paths are possible, wherein a mixture of reflecting and transmissive beam paths can also not be ruled out.

The micromirror 3 in the present example, which oscillates around two axes and is generally called beam deflection means 3, is controlled by means of driver signals and caused to oscillate at a constant, e.g. in two directions which are orthogonal to one another, but in many cases in x-direction and y-direction at a different frequency, wherein these oscillations can correspond particularly to the mechanical natural frequency of the micromirror in the corresponding axes. It must be noted that other beam deflection means, such as movable prisms, can also be used, even though the use of a micromirror is preferred.

The laser beam 2" thus scans over the light conversion means 5, which is generally planar but not necessarily so, and generates an illuminated image 6 with a predetermined light distribution. This illuminated image 6 is then projected as light image 6' onto the road 8 by means of a projection system 7. For that purpose, the laser light source is controlled with pulses with high frequency or continuously, and so, depending on the position of the micromirror, any type of light distribution is not only adjustable—for example, high beam/low beam—but also quickly changeable, when this is required due to a specific terrain or road situation, for example, if pedestrians or oncoming vehicles are detected by sensors and a corresponding change of the geometry and/or intensity of the light image 6' of the road illumination is desired. In this case, the projection system 7 is depicted in a simplified manner as lens, and the term "road" is used for simplification reasons because it naturally depends on the local conditions, whether the light image 6' is actually located on the road or extends beyond it. In principle, the image 6' corresponds to a projection onto a perpendicular surface, and as such, is also depicted as "road," in accordance with the relevant standards regarding the illumination technology for motor vehicles.

FIG. 1a shows the angular deflection of the micromirror 3, here in the X-direction, and two consecutive half-periods are denoted with $t_1$ and $t_2$. Due to the specific geometry of the image convolution means 4, a hollow cone-shaped mirror in FIG. 1, two sub-images are generated by means of a corresponding deflection of the laser beam 2" on the light conversion means 5 and thus on the light image 6' projected onto the road; in FIG. 1, a left sub-image is generated during the first half-period $t_1$, and a right sub-image during the second half-period $t_2$.

Whether the sub-images pertaining to the times $t_1$ and $t_2$ lie at a distance from one another, directly next to one another or overlap is determined by the distance of the image convolution means 4 from the light conversion means 5 as well as the angle β, wherein this distance corresponds to the length of the laser beam 2" plotted in FIG. 1. Generally, particularly in case of block-out processes, it is advantageous if the areas mentioned are directly adjacent to one another. An overlapping, which occurs if the light conversion means 4 lies closer to the image convolution means 4, wherein this area is scanned twice by the laser beam in one pivoting process, can be quite desirable in order to realize an area of the illumination with higher intensity. When image convolution means, as shown further down, e.g. in FIG. 8c, which split and fold by more than one line, the above deliberations regarding an overlapping apply accordingly.

Using the three consecutive drawings FIGS. 2a, b, c, this becomes even more evident. The laser light source 1, consisting exemplary as shown here of a laser diode 1a and focusing optics 1b, emits the laser beam 2 according to FIG. 2a, said laser beam 2 being reflected on the oscillating micromirror 3 and deflected as reflected beam 2' onto the image convolution means 4. In the present example, this image convolution means 4 is shown as a mirror which does not have a continuously planar surface but two partial surfaces which are slightly inclined toward one another at an angle β, said partial surfaces bearing against one another along a folding line 4z insofar as only the folding of the image in one coordinate direction is concerned. However, it is possible to use such an image convolution means with two surfaces, which are inclined toward one another, in systems with a mirror deflection in two coordinate directions.

In case of a hollow cone-shaped mirror (FIG. 1), this folding center is not a line but a point which is also denoted with 4z.

The focusing optics 1b are designed such that their focal length advantageously falls in the central area of the light conversion means 5. This ensures that, due to the beam paths of the corresponding laser beams which have different lengths due to the image convolution means, at least such area on the phosphorus is sharply focused that forms the center of the desired light distribution. It is thus possible to "more finely" block out traffic participants in this area.

With regard to the angle β, it is based on the distance of the image convolution means 4 to the phosphorus of the light conversion means, its measurements, the angle of incidence of the laser beam as well as the amplitude of the micromirror, and generally on the precise geometric arrangement of the components to one another. This angle β can be between 1 and 90° and, in order to be able to realize a compact structure, it is in practice preferably between 5° and 45°, particularly preferably between 10° and 15°.

With regard to a compact space-saving design, it is advantageous to arrange a laser diode or laser diodes of the laser light source 1 such that, as shown in the drawings, their main direction of irradiation is normal to the phosphorus plane or the optical axis of the imaging system arranged downstream from the phosphorus, or that an additional deflection unit provides for such a beam path.

Figure 2B:
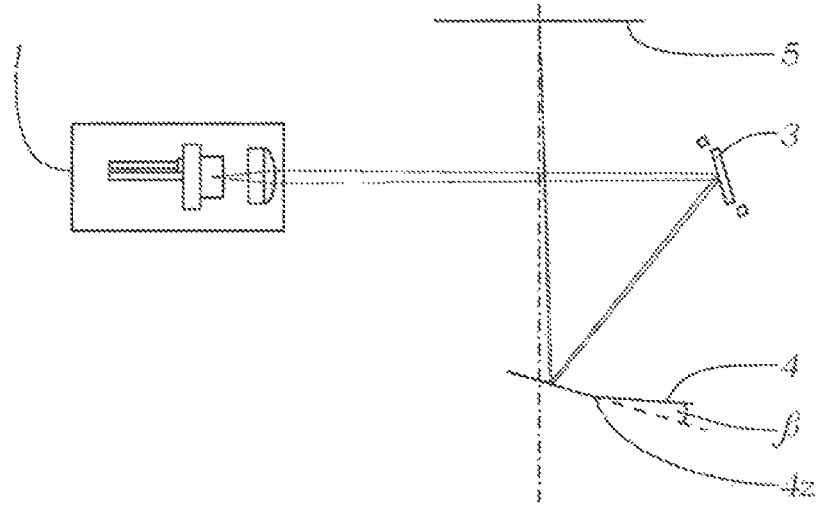
Figure 2C:
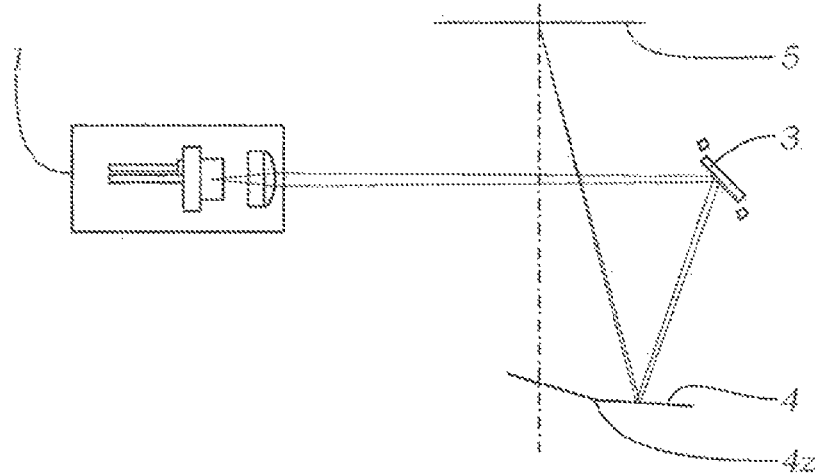

FIG. 2 shows that in the extreme positions of the micromirror 3, the laser beam 2' is deflected such that it impinges as deflected beam 2" on the center of the light conversion means 5. The two extreme positions of the micromirror are shown in FIGS. 2b and 2c.

Figure 3:
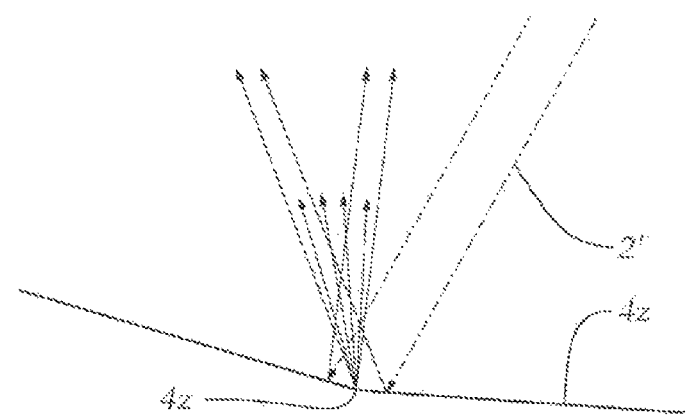
FIG. 3 shows schematically the beam path in the folding region of a folding mirror.

Reference is now made to FIG. 3, which once again shows an image convolution mirror 4 with a folding line 4z and a laser beam 2' arriving from the micromirror. In the area of the folding line, production-related edge rounding must be expected on the mirror 4, i.e. generally, there will never be a perfect edge and therefore, stray light must be expected, when the laser beam 2' passes this area, which is indicated by four arrows originating from the folding line 4z.

Figure 4A:
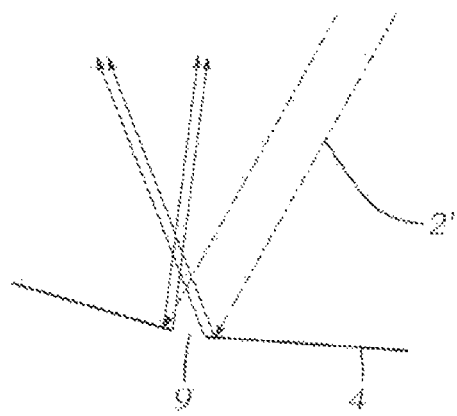
FIGS. 4a to 4d show in depictions similar to FIG. 3 possible measures for preventing strong light scatter in the folding region.
Figure 4B:
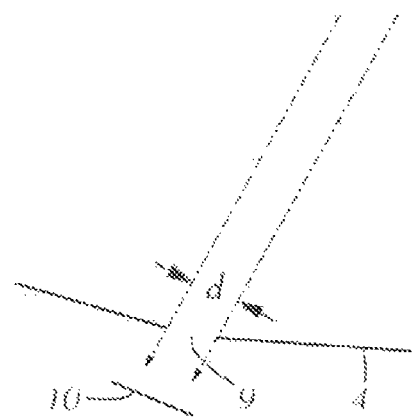

In order to eliminate this unwanted effect, it is possible, as is shown in FIGS. 4a and 4b, to provide a recess 9 in the folding area or the center of a cone-shaped mirror, wherein an absorber surface 10 can possibly be arranged downstream of this recess 9. The recess 9 does not interfere because by means of the corresponding area of the folding mirror 4, only the respective outer areas of the illuminated image are generated. In other words, the image convolution means 4 in an area of the splitting/folding center 4 is designed so as not to be reflecting.

Figure 4C:
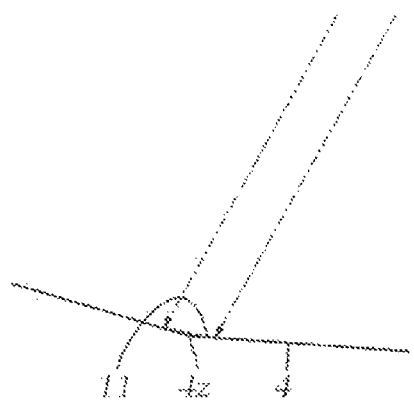
Figure 4D:
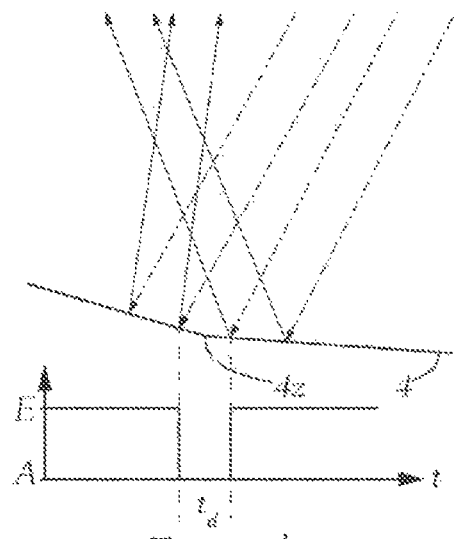

Alternatively, as is shown in FIG. 4c, the mirror can be designed with an absorbing coating 11 in the folding area. FIG. 4d shows a further alternative for preventing stray light in the folding area, i.e. the laser beam 2" scanning the mirror in the critical area, which can have a measurement d (FIG. 4b), is deactivated. This is shown in the time diagram in FIG. 4d below the mirror 4, wherein it can be seen that the laser light source, proceeding from an activated state E during a time period $t_d$, is transferred to a deactivated state A.

With regard to this measurement d, which in a hollow cone-shaped mirror corresponds to a diameter d, it is advantageous if this distance corresponds at least to the width or the diameter of the laser beam in order to prevent a splitting of the laser beam to both halves of the image, as is shown in FIG. 4a by means of two beams arranged closely to one another. It is understood that this measurement d can correspond to the diameter of a hole in case of a hollow cone-shaped mirror or the width of a recess or opening 9, and which has its equivalent in the "time range" according to FIG. 4d. The folding lines or apexes can generally also be called splitting/folding center.

Figure 5:
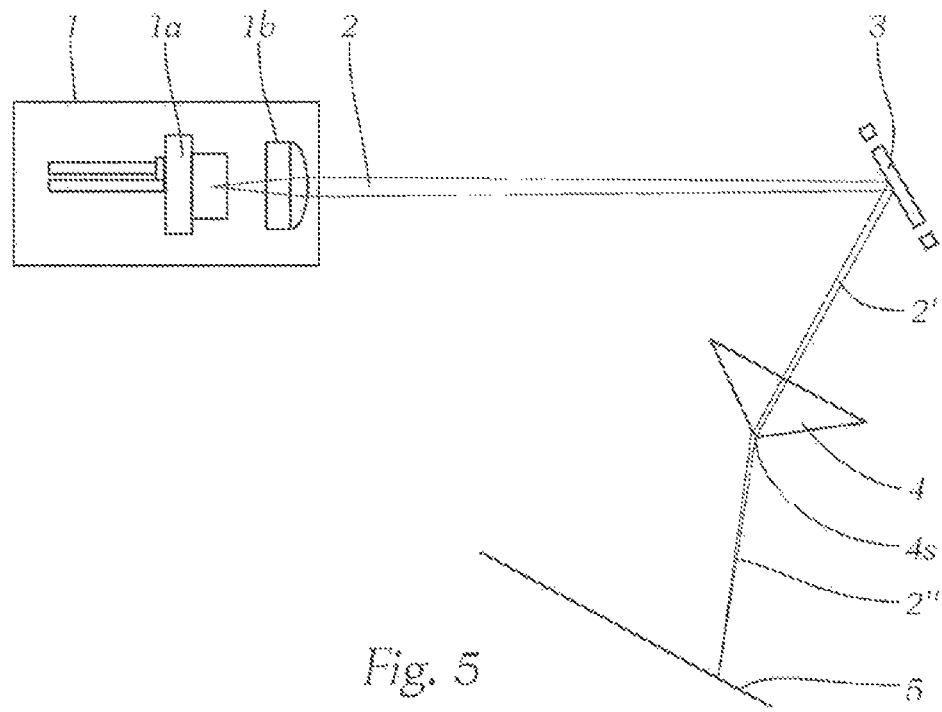
FIG. 5 shows the schematic beam path, when a folding prism is used.

The drawing in FIG. 5 is supposed to show that the image convolution means 4 can also be designed as triangular prism, wherein the prism apex 4s corresponds to the folding line 4z (folding center) shown in connection with an image convolution mirror. It is once again possible to take measures to prevent stray light in the area of the apex or apex line 4s of the prism, particularly by the scanning of the laser, as is shown in FIG. 4c or FIG. 4d.

Figure 6:
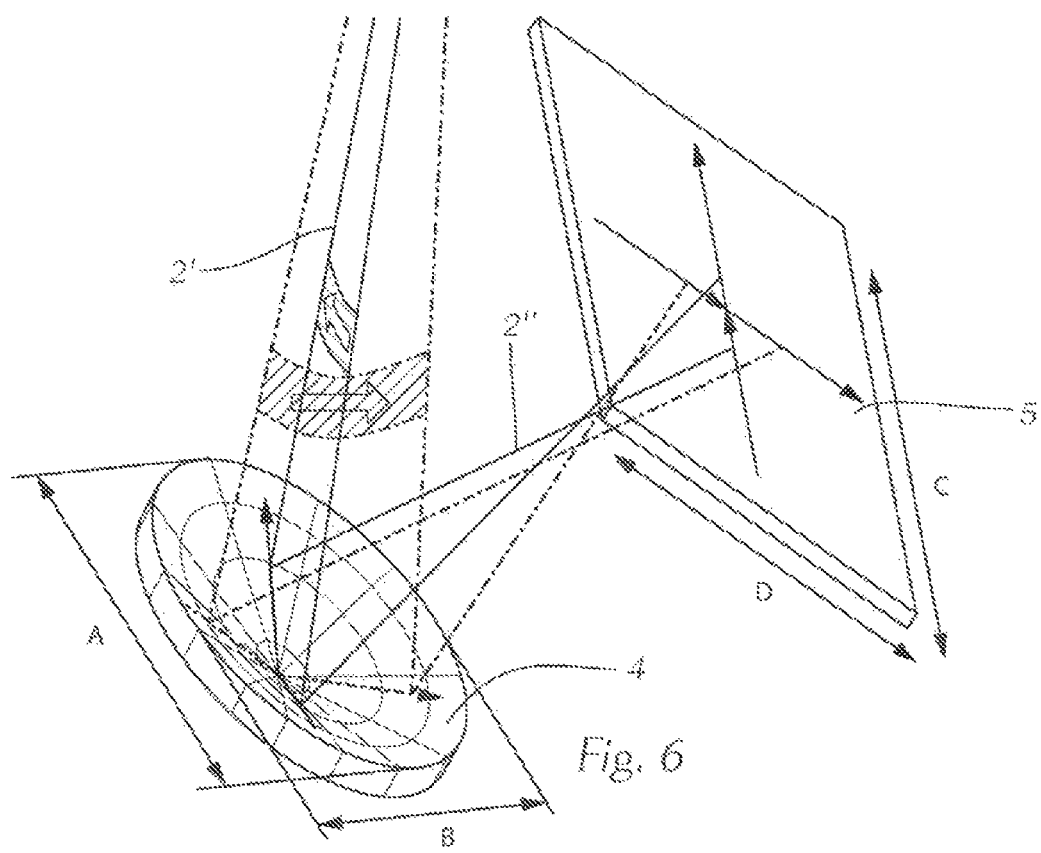
FIG. 6 shows in a detailed view the beam path in the area of a hollow cone-shaped folding mirror and the light conversion means.

For better illustration purposes, FIG. 6 shows as enlarged depiction, analogous to FIG. 1, how the laser beams 2', arriving from a micromirror, are deflected by means of a hollow cone-shaped mirror serving as image convolution means 4, and are impinging on the light conversion means 5 as deflected laser beams 2". The beam deflection center or the micromirror 3 oscillates in two directions, here denoted as x-direction and y-direction, which are orthogonal to one another, wherein the light image 6' generated on the road is typically wider in the horizontal x-direction than in the perpendicular y-direction. The effective measurements of the image convolution means 5 in x- and y-direction are denoted with A and B, the corresponding measurements of the light conversion means 5 are denoted with D and C.

The image scanned onto the light conversion means 5 thus also has a longer and a shorter side, and the image convolution means 4 must also be adjusted accordingly. Therefore, the ratio of length to width of the light conversion means 5 equals the length/width ratio of the image convolution means 4, and thus—with reference to FIG. 6—A/B essentially equals C/D. These are of course the optically effective measurements of the image convolution means 4 and the light conversion means 5 in the beam deflection directions. However, it must be noted that this no longer applies to the realization of a bending light or a headlight range adjustment, as shall be described below using FIGS. 11a, b, because the phosphorus surface of the light conversion means 5 must be increased by the pivoting range of the image convolution means 4.

Figure 7:
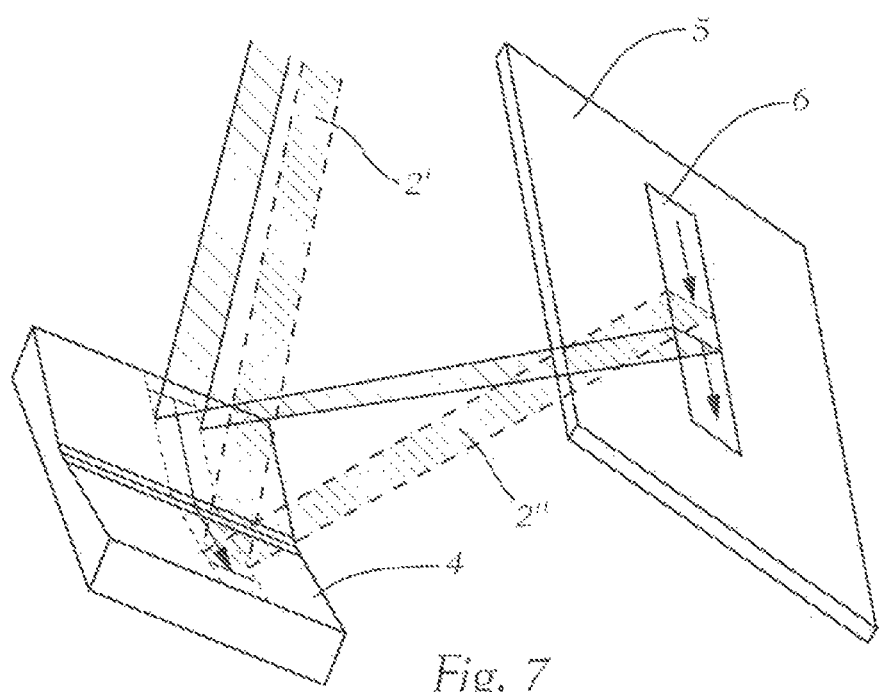
FIG. 7 shows in a view similar to FIG. 6 the beam path in the area of a folded-planar folding mirror and the light conversion means for a beam which fans out and scans in only one coordinate direction.

As mentioned above, a micromirror 3 oscillating in x- and y-direction can be used, but it is also possible to use a micromirror, which oscillates only in one coordinate direction, e.g. the x-direction, for deflecting the laser beam 2 emitted from the laser light source, which is particularly sensible if the laser beam is fanned out in order to generate a light band. FIG. 7 shows the incidence of such a fanned out laser beam 2' and its deflection at an image convolution means 4, in this case designed as folding mirror. The split and folded laser beams 2, 2' originating from this mirror subsequently generate a light band as light image 6' on the light conversion means 5, said light band being composed such that its bright areas lie in the center.

Figure 8A:
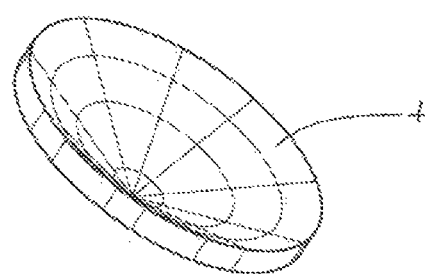
FIGS. 8a to 8c show in detail possible embodiments of a folding mirror.
Figure 8B:
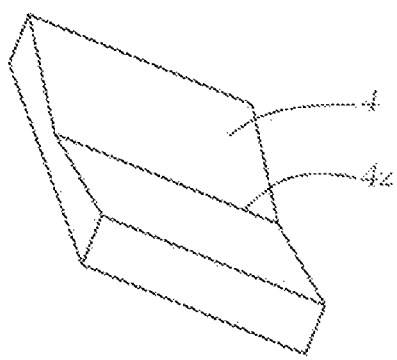
Figure 8C:
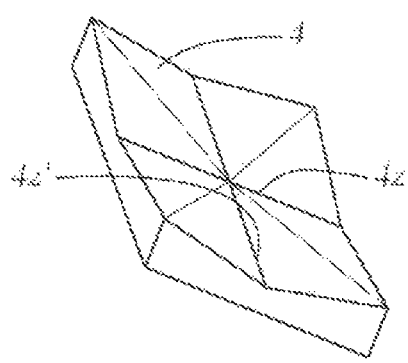

FIGS. 8a, 8b, and 8c show three different embodiments of an image convolution means 4 in more detail, i.e. FIG. 8a shows the design of the image convolution means 4 as a hollow cone-shaped mirror, FIG. 8b shows the design of the image convolution means 4 as a mirror with two planar planes and a folding line 4z, and FIG. 8c shows the design of a mirror for splitting and folding of an image or the laser beams in two coordinate directions which are orthogonal to one another, wherein not only the first folding line 4z but also a second folding line 4z' perpendicular to the first folding line 4z is necessarily present.

Figure 9:
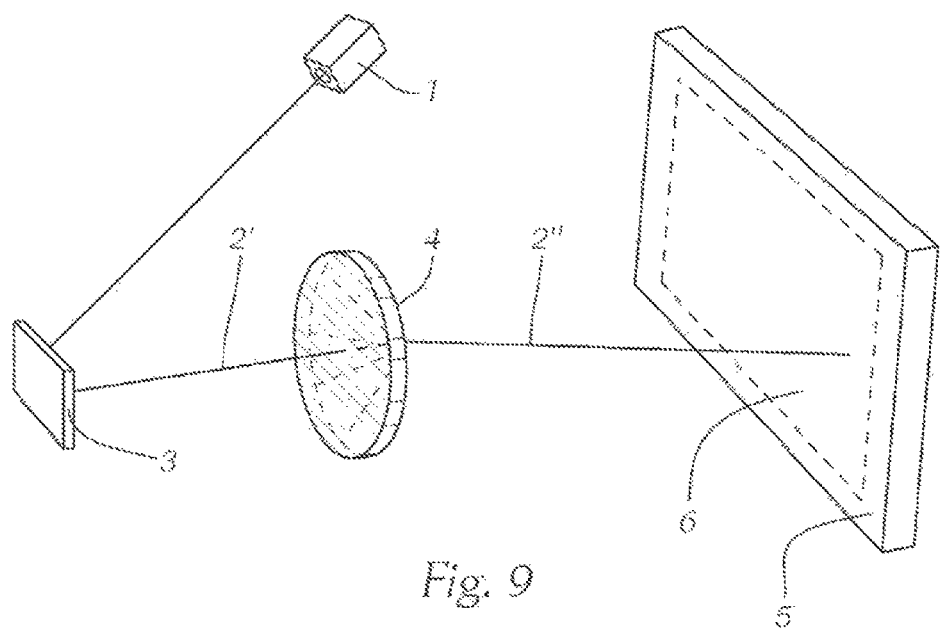
FIG. 9 shows in a depiction similar to FIG. 1 the use of a light conversion means with transmissive beam path and a cone prism as image convolution means.
Figure 10A:
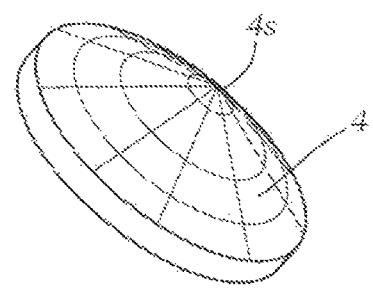
FIGS. 10a to 10c show in detail different embodiments of prismatic image convolution means.
Figure 10B:
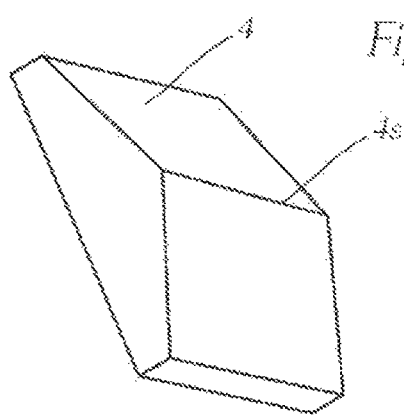
Figure 10C:
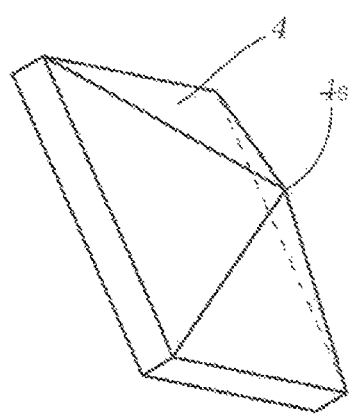

FIG. 9 shows the beam path and the image splitting or folding by using an image convolution means 4, which in the present case is designed as cone-shaped prism. FIGS. 10a, 10b, and 10c show further embodiments of the image convolution means 4 as prisms, the function of which essentially corresponds to the image convolution means shown in FIGS. 8a, 8b, and 8c, which are designed as mirrors. FIG. 10a shows the image convolution means 4 already depicted in FIG. 9, i.e. a cone-shaped prism. FIG. 10b shows a triangular prism with the apex line 4a for splitting and folding in a coordinate direction, and FIG. 10c eventually show a pyramid-shaped prism 10c for deflecting or splitting and folding in two coordinate directions with an apex 4s.

It is also possible to derive a further function from the presence of the image convolution means 4, which is shown in FIGS. 11a and 11b. For this purpose, it is provided but not shown in detail that the image convolution means 4 in FIGS. 11a and 11b is a mirror movably mounted in at least one coordinate direction and adjustable by means of an actuator 12. It is indicated in FIG. 11a that a headlight range adjustment is possible if the image convolution means, i.e. the mirror 4, is pivoted such that the laser beam 2', which scans and impinges on the light conversion means 5, is also pivoted with regard to height, resulting in a corresponding pivoting of the light image 6' in height direction after passing through the projection system 7.

Analogously, FIG. 11b shows a pivoting in lateral direction for realizing a bending light, i.e. a pivoting of the image convolution means 4, which is designed as mirror, results in a left-right pivoting of the light image 6'.

The invention claimed is:

1. A method for producing a light distribution on a road (8) using a motor vehicle headlight, the method comprising:
   directing at least one laser beam (2) that is configured to be modulated in intensity in at least one coordinate direction in a scanning manner to a light conversion means (5) using at least one controlled beam deflection means (3) in order to generate an illuminated image (6) on same, said illuminated image being projected as a light image (6') onto the road using projection optics (7), and
   splitting the illuminated image generated from the laser beam (2) using the beam deflection means (3) into sub-images by deflecting the laser beam (2') by an image convolution means (4),
   wherein the sub-images are projected in a mirror-imaged manner in relation to a division line onto the light conversion means (5) to be combined and form the illuminated image (6) in its entirety,
   wherein:
   the laser beam (2) is deflected by the beam deflection means (3) in two directions which are essentially orthogonal to one another,
   the laser beam (2) is optically/electrically blocked out in an area of a splitting/folding center (4z),
   the image convolution means (4) is adjusted in at least one coordinate direction by an actuator (12) in order to shift the illuminated image (6) or the light image (6'), or
   a distance of the sub-images from one another is determined by changing a distance of the image convolution means (4) from the light conversion means (5).

2. The method of claim 1, wherein the laser beam (2, 2', 2") is fanned out for producing a light band as the illuminated image (6, 6').

3. A headlight for motor vehicles, the headlight comprising:
   at least one laser light source (1);
   at least one light conversion means (5), which has a phosphorus for light conversion;
   a beam deflection means (3) configured to receive a laser beam (2) from the at least one laser light source and to direct the laser beam (2) in a scanning manner to the at least one light conversion means (5); and
   a projection system (7) for projecting an illuminated image (6) generated at the at least one light conversion means, as a light image (6') onto a road (8),
   wherein an image convolution means (4) is arranged between the beam deflection means (3) and the light conversion means (5),
   wherein the image convolution means (4) comprises:
   a hollow cone-shaped mirror,
   a mirror with at least two planar planes which are inclined to one another at an angle ($\beta$), or
   a cone-shaped, triangular, or pyramid prism.

4. The headlight of claim 3, wherein the image convolution means comprises the mirror with at least two planar planes and the angle ($\beta$) is between 5° and 45°.

5. The headlight of claim 3, wherein the image convolution means (4) is configured to not reflect in an area of a splitting/folding center (4z).

6. The headlight of claim 5, wherein the area of the splitting/folding center (4) has a measurement (d) which corresponds at least to a width of the laser beam.

7. The headlight of claim 3, wherein a ratio of optically effective measurements of the image convolution means (4) and the light conversion means (5) is at least approximately similar in two beam deflection directions.

8. The headlight of claim 3, wherein the image convolution means (4) is movably mounted in at least one coordinate direction and adjustable by an actuator (12).

9. The headlight of claim 4, wherein the angle ((3) is between 10° and 15°.

10. A headlight for motor vehicles, the headlight comprising:
   at least one laser light source (1);
   at least one light conversion means (5), which has a phosphorus for light conversion;
   a beam deflection means (3) configured to receive a laser beam (2) from the at least one laser light source and to direct the laser beam (2) in a scanning manner to the at least one light conversion means (5); and
   a projection system (7) for projecting an illuminated image (6) generated at the at least one light conversion means, as a light image (6') onto a road (8),
   wherein an image convolution means (4) is arranged between the beam deflection means (3) and the light conversion means (5), and
   wherein the image convolution means (4) is configured to not reflect in an area of a splitting/folding center (4z).

11. The headlight of claim 10, wherein the area of the splitting/folding center (4) has a measurement (d) which corresponds at least to a width of the laser beam.

12. A headlight for motor vehicles, the headlight comprising:
   at least one laser light source (1);
   at least one light conversion means (5), which has a phosphorus for light conversion;
   a beam deflection means (3) configured to receive a laser beam (2) from the at least one laser light source and to direct the laser beam (2) in a scanning manner to the at least one light conversion means (5); and
   a projection system (7) for projecting an illuminated image (6) generated at the at least one light conversion means, as a light image (6') onto a road (8),
   wherein an image convolution means (4) is arranged between the beam deflection means (3) and the light conversion means (5), and
   wherein a ratio of optically effective measurements of the image convolution means (4) and the light conversion means (5) is at least approximately similar in two beam deflection directions.

13. A headlight for motor vehicles, the headlight comprising:
   at least one laser light source (1);
   at least one light conversion means (5), which has a phosphorus for light conversion;
   a beam deflection means (3) configured to receive a laser beam (2) from the at least one laser light source and to direct the laser beam (2) in a scanning manner to the at least one light conversion means (5); and
   a projection system (7) for projecting an illuminated image (6) generated at the at least one light conversion means, as a light image (6') onto a road (8),
   wherein an image convolution means (4) is arranged between the beam deflection means (3) and the light conversion means (5), and
   wherein the image convolution means (4) is movably mounted in at least one coordinate direction and adjustable by an actuator (12).

14. A motor vehicle headlight comprising:
   a laser light source;
   a light converter which comprises a phosphorus;
   a beam deflector configured to receive a laser beam from the laser light source and to direct the laser beam in a scanning manner to the light converter;
   a projection system for projecting an illuminated image, generated at the light converter, as a light image onto a road; and
   an image convolution device arranged between the beam deflector and the light converter, wherein the image convolution device comprises:
   a hollow cone-shaped mirror,
   a mirror with at least two planar planes which are inclined to one another at an angle (β), or
   a cone-shaped, triangular, or pyramid prism.

* * * * *